(12) United States Patent
Ebrahimi Afrouzi et al.

(10) Patent No.: US 12,025,988 B1
(45) Date of Patent: Jul. 2, 2024

(54) SYSTEMS AND METHODS FOR SENDING SCHEDULING INFORMATION TO A ROBOTIC DEVICE

(71) Applicants: Ali Ebrahimi Afrouzi, San Diego, CA (US); Andrew Fitzgerald, Toronto (CA); Chin Pang Alfred Kwan, Toronto (CA)

(72) Inventors: Ali Ebrahimi Afrouzi, San Diego, CA (US); Andrew Fitzgerald, Toronto (CA); Chin Pang Alfred Kwan, Toronto (CA)

(73) Assignee: AI Incorporated, Toronto (CA)

( * ) Notice: Subject to any disclaimer, the term of this patent is extended or adjusted under 35 U.S.C. 154(b) by 69 days.

(21) Appl. No.: 17/409,663

(22) Filed: Aug. 23, 2021

Related U.S. Application Data

(63) Continuation of application No. 16/051,328, filed on Jul. 31, 2018, now Pat. No. 11,188,095.

(60) Provisional application No. 62/624,891, filed on Feb. 1, 2018, provisional application No. 62/539,414, filed on Jul. 31, 2017.

(51) Int. Cl.
*H04L 12/28* (2006.01)
*G05D 1/00* (2006.01)
*G07C 5/00* (2006.01)

(52) U.S. Cl.
CPC ......... *G05D 1/0285* (2013.01); *G05D 1/0088* (2013.01); *G05D 1/0225* (2013.01); *G05D 1/028* (2013.01); *G07C 5/008* (2013.01); *H04L 12/2818* (2013.01); *H04L 12/2825* (2013.01)

(58) Field of Classification Search
CPC .. G05D 1/0285; G05D 1/0088; G05D 1/0225; G05D 1/028; G05D 2201/0203; G05D 2201/0208; G05D 2201/0215; G07C 5/008; H04L 12/2818; H04L 12/2825
USPC ........................................................ 700/245
See application file for complete search history.

(56) References Cited

U.S. PATENT DOCUMENTS

| | | | |
|---|---|---|---|
| 6,845,297 B2 | 1/2005 | Allard | |
| 8,380,349 B1 | 2/2013 | Hickman | |
| 9,233,468 B2 | 1/2016 | Gong | |
| 9,486,924 B2 | 11/2016 | Dubrovsky | |
| 2005/0287038 A1 | 12/2005 | Dubrovsky | |
| 2007/0192910 A1 | 8/2007 | Vu | |
| 2008/0109114 A1* | 5/2008 | Orita | B25J 19/005 901/50 |
| 2009/0248200 A1 | 10/2009 | Root | |
| 2011/0264305 A1 | 10/2011 | Choe | |

(Continued)

*Primary Examiner* — B M M Hannan

(57) ABSTRACT

A method of sending scheduling information to a robotic device is provided, comprising: generating, with an application of a communication device, at least one scheduling command, the application comprising a graphical user interface; transmitting, with the application, the at least one scheduling command to a router, wherein the router is configured to transmit the at least one scheduling command to a cloud service; receiving, with a processor of a robotic device, the at least one scheduling command from the cloud service; generating or modifying, with the processor of the robotic device, scheduling information of the robotic device based on the at least one scheduling command; and suggesting, with the processor of the robotic device, a schedule of the robotic device based on previously received operational instructions and times of executing the instructions by the robotic device.

20 Claims, 6 Drawing Sheets

(56) References Cited

U.S. PATENT DOCUMENTS

| | | |
|---|---|---|
| 2014/0207280 A1 | 7/2014 | Duffley |
| 2014/0207281 A1* | 7/2014 | Angle .................. H04L 12/282 |
| | | 700/257 |
| 2014/0207282 A1* | 7/2014 | Angle .................. B25J 13/006 |
| | | 901/1 |
| 2015/0016417 A1 | 1/2015 | Dees |
| 2015/0052703 A1* | 2/2015 | Lee ..................... G05D 1/0255 |
| | | 701/28 |
| 2016/0135655 A1 | 5/2016 | Ahn |
| 2016/0299549 A1 | 10/2016 | Zeine |
| 2017/0011638 A1* | 1/2017 | Agrawal .......... G06Q 10/06316 |
| 2017/0050527 A1* | 2/2017 | Tsuchiya ................ B60L 50/51 |
| 2017/0203439 A1* | 7/2017 | Shin ..................... B25J 9/1689 |
| 2017/0224183 A1 | 8/2017 | Dubrovsky |
| 2017/0265703 A1* | 9/2017 | Park ......................... B25J 9/16 |
| 2017/0320215 A1 | 11/2017 | Strandberg |
| 2017/0349058 A1 | 12/2017 | Bernier |
| 2017/0361468 A1 | 12/2017 | Cheuvront |
| 2018/0139896 A1 | 5/2018 | Wahlgren |
| 2018/0225444 A1 | 8/2018 | Frenz |
| 2018/0249515 A1 | 8/2018 | Li |
| 2018/0259973 A1 | 9/2018 | Maruo |
| 2018/0263450 A1* | 9/2018 | Kim ..................... G05D 1/0033 |
| 2018/0344116 A1* | 12/2018 | Schriesheim ........ G05D 1/0016 |
| 2018/0348783 A1 | 12/2018 | Pitzer |

\* cited by examiner

Traditional RF communication with a robot

SYSTEMS AND METHODS FOR SENDING SCHEDULING INFORMATION TO A ROBOTIC DEVICE

CROSS-REFERENCE TO RELATED APPLICATIONS

This application is a Continuation of U.S. Non-Provisional patent application Ser. No. 16/051,328, filed Jul. 31, 2018, which claims the benefit of U.S. Provisional Patent Application No. 62/539,414, filed Jul. 31, 2017 and 62/624,891 filed Feb. 1, 2018, each of which is hereby incorporated by reference herein. In this patent, certain U.S. patents, U.S. patent applications, or other materials (e.g., articles) have been incorporated by reference. Specifically, U.S. Application Nos. 62/548,784, 62/667,977, 62/661,802, Ser. Nos. 15/949,708, 15/272,752, and 15/449,660 are hereby incorporated by reference. The text of such U.S. patents, U.S. patent applications, and other materials is, however, only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

FIELD OF THE DISCLOSURE

The present invention relates to robotic devices in general, and more specifically to methods for sending scheduling information to a robotic device.

BACKGROUND

Robotic devices are becoming increasingly common in consumer homes and commercial spaces. These may include robotic vacuums, robotic mops, robotic lawn mowers, and other devices that move autonomously or semi-autonomously through a working environment. As these types of devices become more common and increasingly used, a method to wirelessly and remotely communicate with these robotic devices becomes more essential in order to provide further oversight and control over the devices. Several methods for sending configuration, scheduling, and control information to a robotic vacuum have been traditionally used; however, the methods of sending information to a robotic vacuum are limited by either the status of the robot or by the position of the communication device, dock, or robot.

For example, sending configuration, scheduling, and control information directly to a robotic device via a communication device connected to a cloud service have traditionally been used (see, e.g., U.S. Patent App. No. 2009/0248200 and U.S. Pat. No. 8,380,349). FIG. 1 depicts a flow chart of a known method of sending configuration, scheduling, and control information via cloud service. Communication device 100 sends information to cloud service 101 via Wi-Fi. Cloud service 101 then sends information to Wi-Fi router 102, which then relays the information to robot 103 via Wi-Fi, so long as robot 103 is within Wi-Fi range and is free of operation or recharging, as can be seen in Case 1. This method is generally limited as information cannot be sent to or retrieved by the robotic vacuum and stored for future processing if the robot is engaged in a cleaning cycle or is recharging or is out of the wireless range, as shown by the communication failure to robot 103 in Case 2, Case 3, and Case 4, respectively. This requires the user to inconveniently wait until, for example, the robot is no longer engaged in a duty cycle, at which time the user may forget to issue the commands or may be preoccupied. In other cases, commands may only be sent in real-time (see, e.g., U.S. Pat. No. 6,845,297). It is preferable that the user be able to issue commands regardless of the robot's status such that the robot may store and queue the new commands for future processing.

A method for scheduling a robot through a remote control has also been traditionally used (see, e.g., U.S. Pat. No. 9,486,924). FIG. 2A depicts a flow chart of a traditional method of sending configuration, scheduling, and control information via radio frequency (RF). Communication device 200 sends required information to dock 201 and robot 202 via wireless RF connection. Dock 201 and robot 202 may also send each other information via wireless RF connection. Unlike the preceding described method, this method is capable of receiving and storing information for future processing; however, the method requires the robot and dock to be within the RF range to be able to receive information sent from the communication device. FIG. 2B depicts failed communication between communication device 200 and docking station 201 and robot 202 as docking station 201 and robot 202 are not within RF range of communication device 200. This is inconvenient for users as they must be within the vicinity of the robot and dock to issue commands. It is preferable that the user be able to issue commands remotely.

Embodiments described herein provide systems and methods for sending scheduling information that is not bound by the status of the robot or by the position of the communication device, dock, or robot.

SUMMARY

The following presents a simplified summary of some embodiments described herein. This summary is not an extensive overview of the invention. It is not intended to identify key or critical elements of the invention or to delineate the scope of the invention. Its sole purpose is to present some embodiments in a simplified form as a prelude to the more detailed description that is presented below.

Embodiments disclosed herein relate generally to a system and method for sending scheduling information to a robotic device, such as a robotic vacuum. In one embodiment, a method of sending scheduling information to a robotic device is provided, comprising: generating, with an application of a communication device, at least one scheduling command, the application comprising a graphical user interface; transmitting, with the application, the at least one scheduling command to a router, wherein the router is configured to transmit the at least one scheduling command to a cloud service; receiving, with a processor of a robotic device, the at least one scheduling command from the cloud service; generating or modifying, with the processor of the robotic device, scheduling information of the robotic device based on the at least one scheduling command; and suggesting, with the processor of the robotic device, a schedule of the robotic device based on previously received operational instructions and times of executing the instructions by the robotic device.

In another embodiment, a system for sending scheduling information to a robotic device is provided, comprising: an application on a communication device comprising a graphical user interface, wherein the application is configured to: generate at least one scheduling command; transmit the at least one scheduling command to a router, wherein the router is configured to transmit the at least one scheduling command to a cloud service; a robotic device configured to: receive the at least one scheduling command from the cloud service; generate or modify scheduling information of the robotic device based on the at least one scheduling command; and suggest a schedule of the robotic device based on previously received operational instructions and times of executing the instructions by the robotic device.

These and other features and advantages of the present invention will be apparent to those skilled in the art in view of the described embodiments with reference to the drawings, as provided below.

BRIEF DESCRIPTION OF THE DRAWINGS

Non-limiting and non-exhaustive features of the present invention are described and depicted with reference to the following figures, wherein like reference numerals refer to like parts throughout the various figures.

DETAILED DESCRIPTION OF CERTAIN EMBODIMENTS

The present techniques will now be described in detail with reference to a few embodiments thereof as illustrated in the accompanying drawings. In the following description, numerous specific details are set forth in order to provide a thorough understanding. It will be apparent, however, to one skilled in the art, that the present techniques may be practiced without some or all of these specific details. In other instances, well known process steps and/or structures have not been described in detail in order to not unnecessarily obscure the present techniques.

Embodiments described herein provide methods and systems to send scheduling information to a robot regardless of the status of the robot and the position of the dock, the robot, or communication device. In some embodiments, scheduling information may comprise time of operation, area of operation, frequency of operation, type of operation, duration of operation and/or any other information relating to the operation and/or function of the robotic device. In some embodiments, a dock (or charging station) in particular may include a housing, charging contacts, which are arranged on the surface of the housing such that the charging contacts of the mobile robot make contact with the charging contacts of the dock when the mobile robot drives up to and against the recharging station, and a power supply, which is electrically coupled to the charging contacts and supplies power thereto.

In some embodiments, a user may send scheduling information remotely using a communication device via Wi-Fi and is not required to be within the vicinity of the robotic device or dock. Communication devices such as an electronic mobile device, smart phone, computer, tablet, or any device that has a Wi-Fi module, may be used to send scheduling information at any time. In some embodiments, the scheduling information is sent to a cloud service via Wi-Fi, to which the dock is connected. The dock is able to retrieve the information from the cloud service. The cloud service may include multiple cloud services or a network of cloud services. Since the dock is available to receive information, information may be sent generally at any time and does not require the robot to be available. In some embodiments, once the robot is ready to accept the information, the dock may transmit the information to the robot via RF. In some embodiments, the dock may transmit the information to the robot via Wi-Fi or by any other type of wireless connection, such as Bluetooth. In some embodiments, the robot may be able to retrieve the information from the cloud service.

Figure 1:
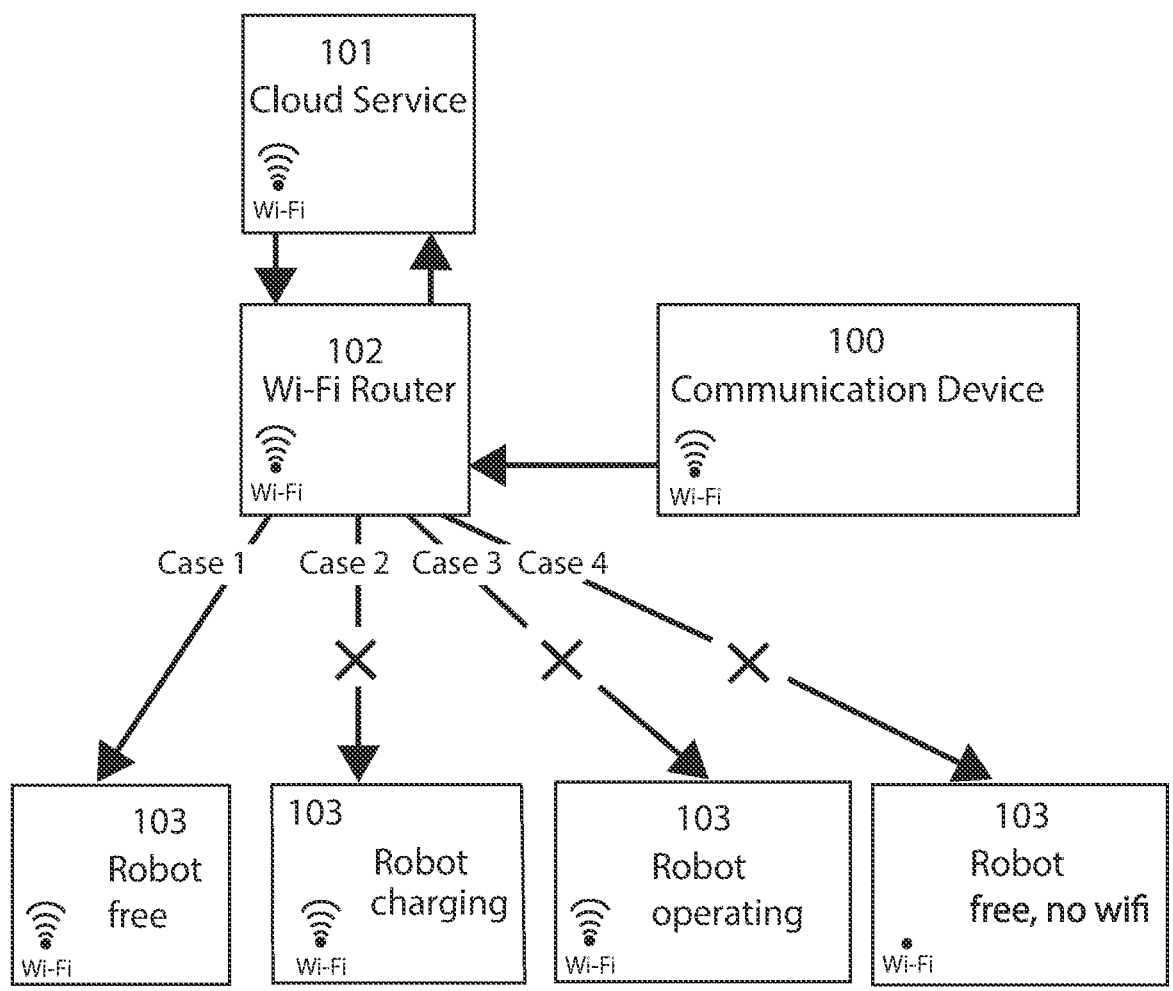
FIG. 1 illustrates a traditional method for sending scheduling information to a robot via a smart phone connected to cloud services.
Figure 2A:
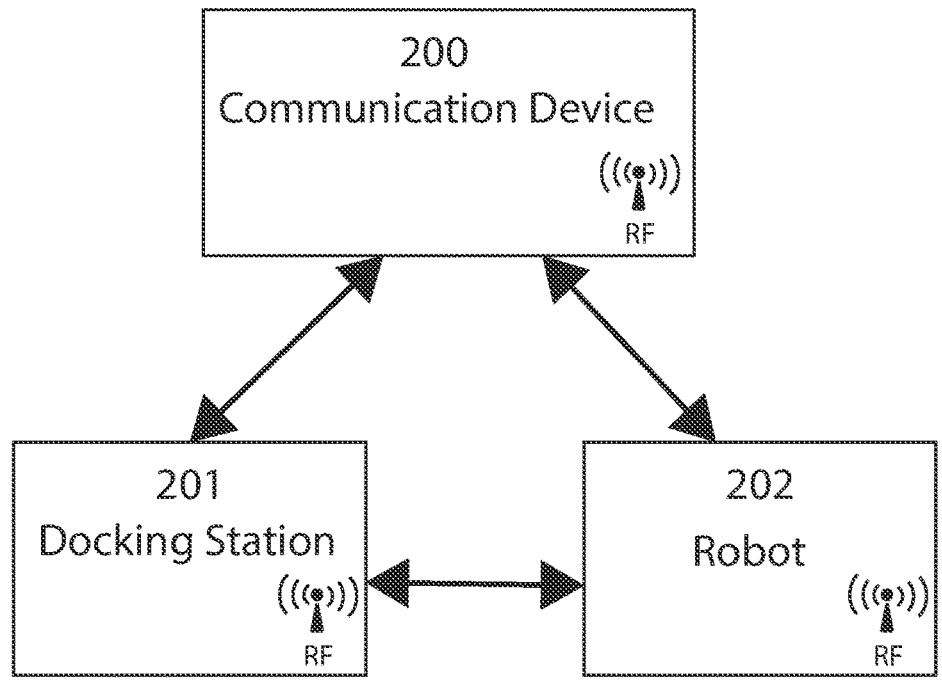
FIGS. 2A and 2B illustrate a traditional method for sending scheduling information to a dock and robot via RF interface.
Figure 2B:
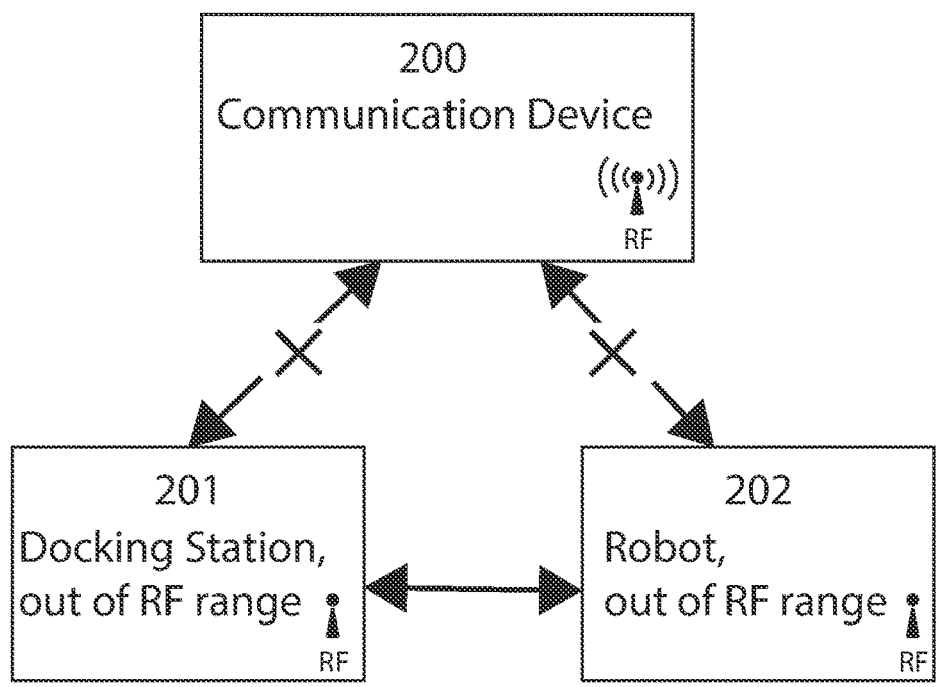
Figure 3A:
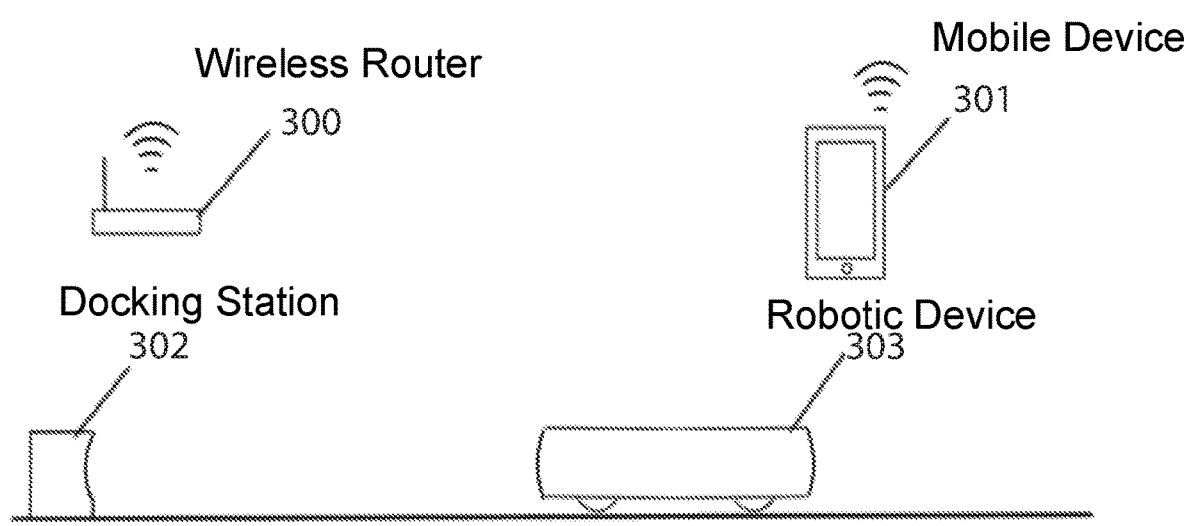
FIGS. 3A and 3B illustrate an embodiment of a method for sending scheduling information to a robot via cloud services and RF interface, in accordance with some embodiments.
Figure 3B:
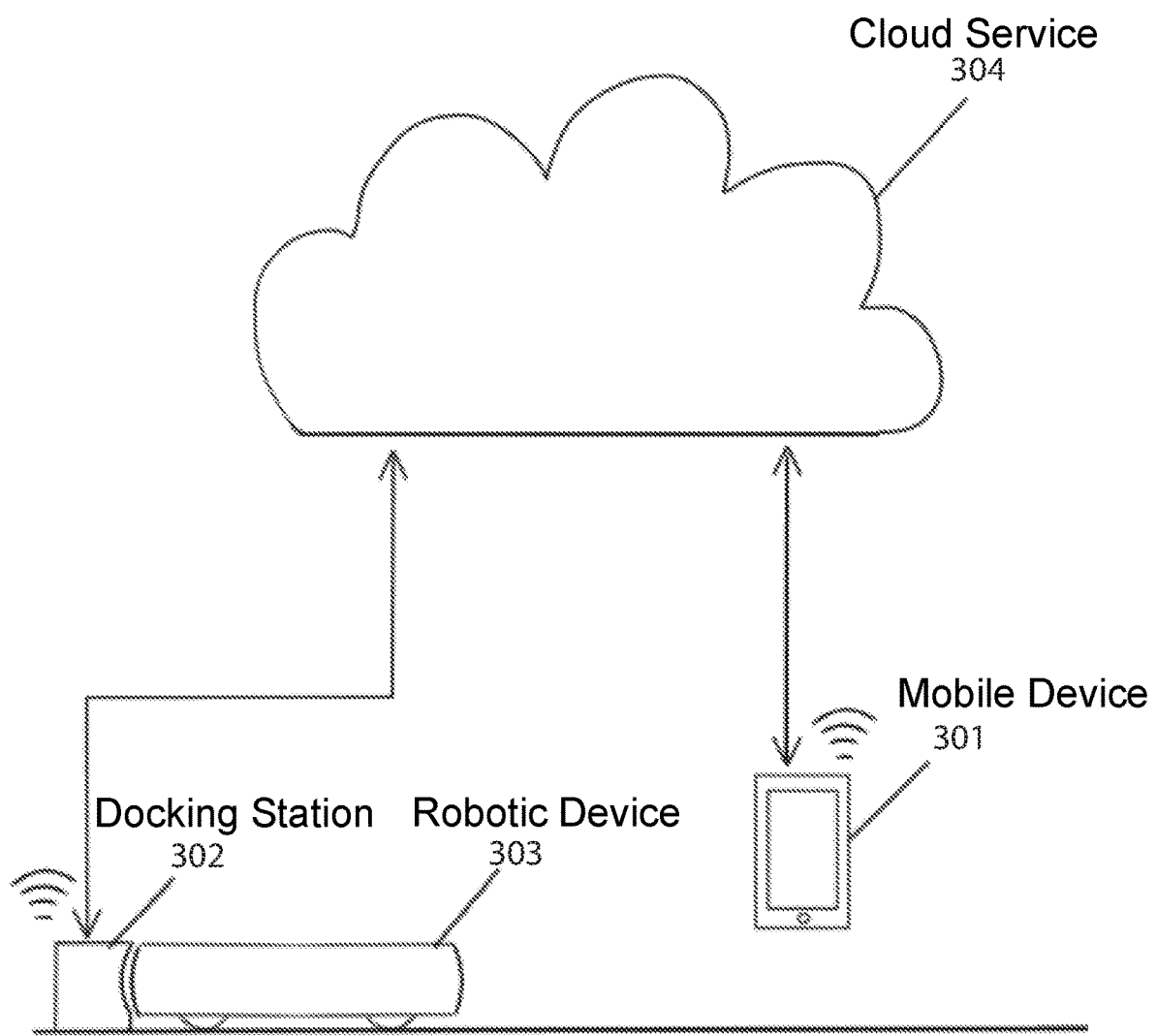

FIGS. 3A and 3B illustrate an embodiment of a method for sending scheduling information to a robot. In FIG. 3A, a wireless router 300 is used to connect mobile device 301 and docking station 302 of robotic device 303 to a Wi-Fi network, such as a home network. In FIG. 3B, an application of mobile device 301 and docking station 302 are wirelessly connected to cloud service 304 via a proprietary or standard protocol. The application of mobile device 301 and docking station 302 may relay or retrieve any information from cloud service 304. For example, the application of mobile device 301 may relay scheduling information to robotic device cloud service 304 remotely. Docking station 302 may then retrieve the scheduling information by connecting with robotic device cloud service 304 as required. Once robot 303 is able to accept information, docking station 302 may relay retrieved information to a processor of robotic device 303 via RF interface. Robot 303 may also relay information, such as status information, back to docking station 302 and docking station 302 may relay the information back to cloud service 304 for mobile device 301 to retrieve. In this example, the transfer of information depicted to and from cloud service 304 is simplified and may comprise additional steps, such as, for example, the transmission of information to wireless router 300 from the application of communication device 301 in the process of relaying the information to cloud service 304.

In some embodiments, the charging station and a software application of the communication device are wirelessly paired such that the charging station and the application of the communication device may transmit or receive information, such as scheduling or robot information, to or from the cloud service. In some embodiments, the application comprises a mobile application designed to run on a mobile, stationary, and/or smart communication device and may be downloaded onto the communication device through various means. In some embodiments, the application comprises a web application that may be accessible through a stationary, mobile, and/or smart communication device through a web browser. In other embodiments, a software may be provided with the robotic device and charging station that may be downloaded onto the communication device. In embodiments, the pairing process may comprise connecting the communication device to a Wi-Fi network that is also accessible to the charging station of the robotic device, and logging into the application of the communication device using unique or standardized login information. In embodiments, the application of the communication device has connectivity with the cloud service. In some embodiments, the application of the communication device may generate a QR barcode comprising the Wi-Fi network's access point's SSID, Wi-Fi network's password (if applicable), and the at least one cloud service login information. In some embodiments, the QR barcode may be provided as a sticker with the robotic device and may comprise the at least one cloud service login information corresponding to the robotic device. In some embodiments, the robotic device may scan the QR barcode to retrieve the Wi-Fi network's access point's SSID, Wi-Fi network's password (if applicable), and the at least one cloud service login information and share the retrieved information with the charging station using an RF communication channel. In some embodiments, the robotic device may receive Wi-Fi network details and/or cloud service login information corresponding to the robotic device through other means, such as user input of network details and/or cloud service login information using a user interface of the robotic device. In some embodiments, the charging station may use the shared Wi-Fi access point's SSID, the Wi-Fi password, and the at least one cloud service login information to connect to the Wi-Fi network and the at least one cloud service and, once connected, the charging station may relay any information related to the robotic device to the at least one cloud service. In some embodiments, the charging station may be connected to the Wi-Fi network through other means, such as user input of network details using a user interface of the charging station. In some embodiments, the communication device application, also having connectivity to the at least one cloud service, may retrieve any information related to the robotic device from the cloud service. In the same way, the charging station may retrieve any information relayed to the at least one cloud service from the communication device application and share it with the robotic device via RF. In some embodiments, the charging station and robotic device may transfer information using other types of wireless communication channels, such as Wi-Fi. Other means of connecting the various components of the system are also possible, such as the use of Bluetooth. Further details may be found in U.S. Patent App. Nos. 62/548,784 and 62/667,977, the entirety of the contents of which are hereby incorporated by reference.

Figure 4:
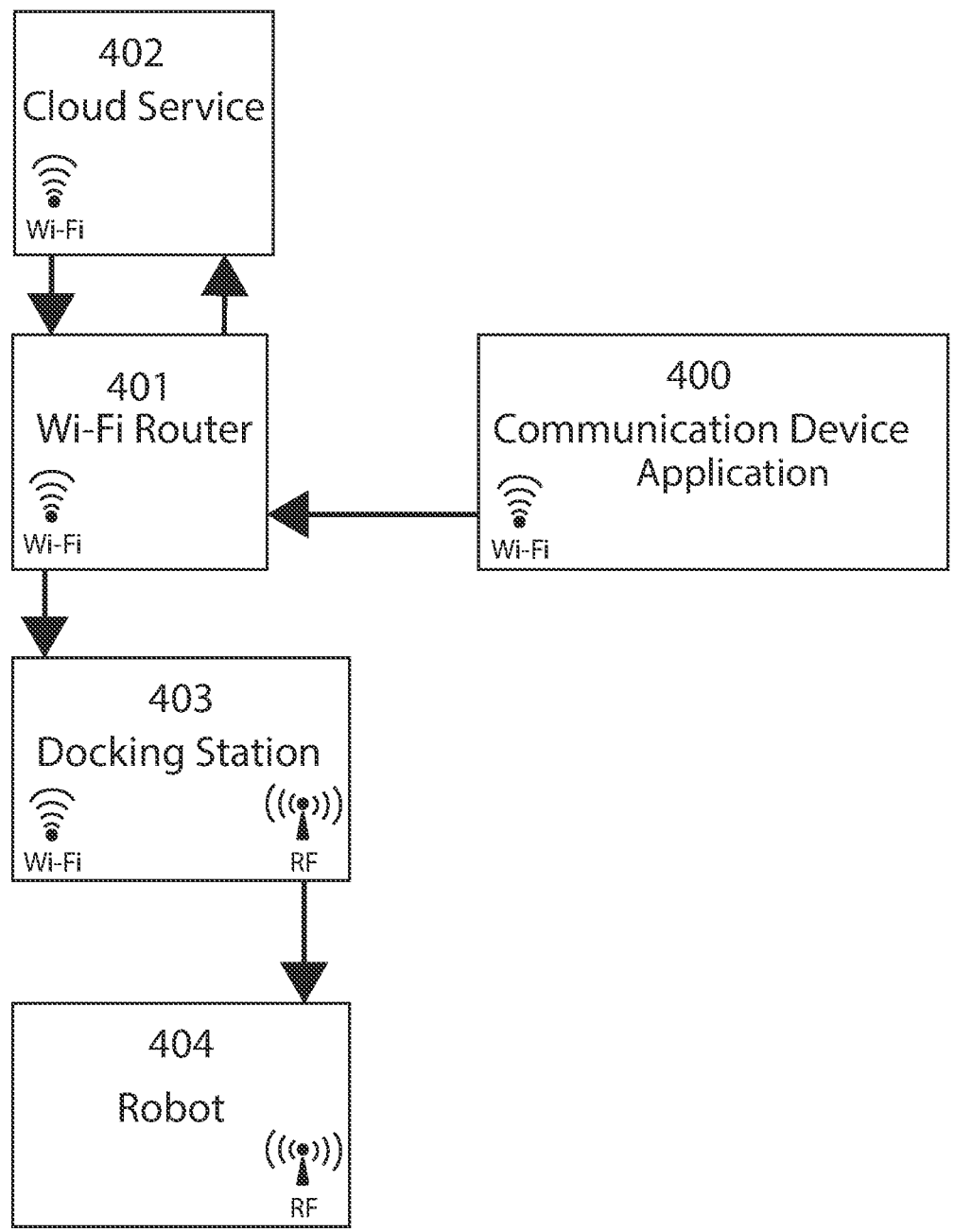
FIG. 4 illustrates a flowchart depicting an embodiment of a method for sending scheduling information to a robot via cloud services and RF interface, in accordance with some embodiments.

FIG. 4 illustrates a flowchart depicting an embodiment of a method of sending scheduling information to a robot via cloud service. An application of communication device 400 transmits scheduling information to Wi-Fi router 401, which then sends the scheduling information to cloud service 402. Cloud service 402 transmits scheduling information to Wi-Fi router 401, which then relays the information to docking station (or charging station) 403. Docking station 403 is able to receive and store information until robot 404 is able to accept the information. Once robot 404 is able to accept information, docking station 403 transmits the information to a processor of robot 404 via wireless RF. In some embodiments, docking station 403 may transmit the information to robot 404 via Wi-Fi or other protocols capable of wireless transmission of information. In some embodiments, the application of the communication device may retrieve information from the cloud service and the docking station may transmit information to the cloud service. In some embodiments, the robot may transmit information to the docking station to transmit to the cloud service. Therefore, in some embodiments the robot, docking station, and application of the communication device may retrieve and transmit information to and from one another. In some embodiments, information may be configured to be transmitted to and received from cloud service 401 via wireless Wide Area Network (WAN) connection, such as a mobile device carrier network. In cases where the data is transmitted and received using a WAN connection, the user may send scheduling information and remotely monitor status information, such as the status of the robot or status of the working environment, such as room temperature. In embodiments, the transfer of information between the application of the communication device, wireless router, and cloud service and/or the charging station, wireless router, and cloud service and/or the charging station and robotic device may comprise additional steps of which are not depicted herein.

Figure 5:
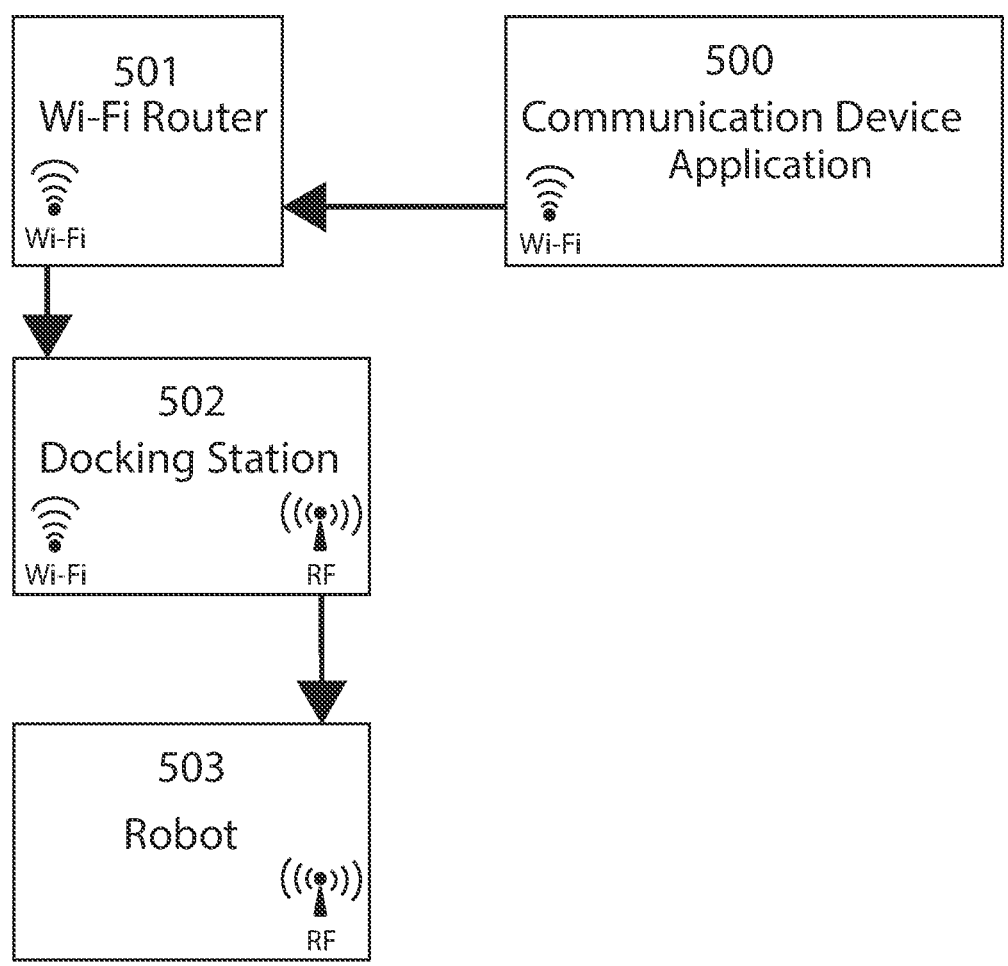
FIG. 5 illustrates a flowchart depicting an embodiment of a method for sending scheduling information to a robot via local connection and RF interface, in accordance with some embodiments.

FIG. 5 illustrates a flow chart depicting an embodiment of a method for sending scheduling information to a robot locally. An application of communication device 500 transmits scheduling information directly to Wi-Fi router 501, which then sends the information to docking station 502 via Wi-Fi. Docking station 502 may receive and store information until robot 503 is able to accept the information. Once robot 503 is able to accept information, docking station 502 may transmit the information to a processor of robot 503 via wireless RF. In some embodiments, docking station 502 may transmit the information to robot 503 via Wi-Fi or other protocols capable of wireless transmission of information. In some embodiments, the application of the communication device may retrieve information from the Wi-Fi router and the docking station may transmit information to the Wi-Fi router. In embodiments, the robot may transmit information to the docking station to transmit to the Wi-Fi router that may later be retrieved by the application of the communication device. Therefore, in embodiments the robot, docking station and application of the communication device may retrieve and transmit information from and to one another. In some embodiments, information may be configured to be transmitted to and received from Wi-Fi router(s) via wireless Local Area Network (LAN) connection. In some embodiments, data may be transmitted and received using LAN connection such that no data is transmitted over WAN. In some embodiments, data may be transmitted and received using both a LAN and a WAN connection. In embodiments, the transfer of information between the application of the communication device and wireless router and/or the charging station and wireless router and/or the charging station and robotic device may comprise additional steps of which are not depicted herein or may be done through other communication channels, such as the use of Bluetooth.

In some embodiments, the docking station may be replaced by any other stationary device capable of transmitting and receiving information to and from the cloud service, and capable of transmitting and receiving information to and from the charging device. In some embodiments, the robotic device may dock or charge at a separate device than the stationary device used for the transfer of information to and from the cloud service and the transfer of information to and from the robotic device. For example, a stationary device having memory, processor, Wi-Fi module and RF module may perform the same functions as those of the charging station depicted in FIG. 4 or FIG. 5. In some embodiments, the robotic device may connect directly to the cloud service and bypass the charging station.

In some embodiments, the communication methods described between the robotic device, charging station, and the application of the communication device may be used for transmitting and receiving several different types of information, such as scheduling information, mapping information, navigation information, cleaning information, operation information or any other type of information that may be useful to the operator of the communication device, the robotic device, and/or the charging station. In some embodiments, these different types of information may be chosen or adjusted using a graphical user interface provided through a software application on a communication device such as a computer, tablet, smartphone, or a dedicated remote control before transmitting the information to the robotic device. The software application may be, but does not have to be, the same or related to the software application used in generating the QR barcode and connecting to the cloud service. For example, scheduling commands such as time of operation, area(s) of operation, the order in which areas are to be operated on, frequency of operation, type of operation corresponding to each area to be operated on, and duration of operation (to name a few) may be set or adjusted using a graphical user interface on a communication device before being transmitted to the robotic device using a communication method such as that described in FIG. 4 or 5.

In another example, maps of the environment may be transmitted from the robotic to an application of a communication device using, for example, the communication architecture depicted in FIG. 4 or 5. Through a user interface, a user may view the map and take any of a variety of actions. In some embodiments, a user may adjust or correct the map boundaries within the user interface by selecting all or part of a boundary line using a cursor, pointer, stylus, mouse, the user's finger, a button or buttons, or other input device on the user interface. Once a boundary line is selected, a user may be provided with various options, such as, but not limited to, deleting, trimming, rotating, elongating, redrawing, moving in a left direction, moving in a right direction, moving in an upward direction, moving in a downward direction, etc. A user may be given the option to redraw a boundary line using a cursor, pointer, stylus, mouse, the user's finger, a button or buttons, or other input devices. Any adjustments or corrections to the map may then be transmitted from the application of the communication device back to the robotic device using, for example, the communication method described in FIG. 4 or 5.

As a further example, robotic floor-cleaning devices may have a plurality of tools that may be used concurrently or independently, such as, but not limited to, a suction tool, a mopping tool, and a UV light for killing bacteria. Robotic floor-cleaning devices may also have various settings, such as a deep cleaning setting, a regular cleaning setting, speed settings, movement pattern settings, cleaning frequency settings, etc. In some embodiments, a user may adjust all of these settings through the user interface and transmit the adjustment command from the application of the communication device to the robotic device. Another example of a type of information that may be transmitted to the robotic device is a cleaning mode comprising, for example, a service condition, a service type, a service parameter, or a service frequency. Service condition may indicate, for example, whether an area is to be serviced or not. In some embodiments, the robot may determine whether to service an area based on a specified service condition in memory. A service type may indicate, for example, what kind of cleaning is to occur. For example, a hard (e.g. non-absorbent) surface may receive a mopping service (or vacuuming service followed by a mopping service in a service sequence), while a carpeted service may receive a vacuuming service. Other services may include a UV light application service, and a sweeping service. A service parameter may indicate, for example, various settings for the robotic device. In some embodiments, service parameters may include, a drive speed parameter, a drive direction parameter, a movement pattern parameter, a cleaning intensity parameter, and a timer parameter. Any number of other parameters may be utilized without departing from embodiments disclosed herein, which is not to suggest that other descriptions are limiting. A service frequency parameter indicates how often an area is to be serviced. In some embodiments, service frequency parameters may include hourly frequency, daily frequency, weekly frequency, and default frequency. A service frequency parameter may be useful when an area is highly used or, conversely, when an area is lightly used. By setting the frequency, more efficient overage of workspaces may be achieved.

In other embodiments, the graphical user interface may be used for various other types of settings or adjustments relating to the operation and function of the robotic device. Further details of the graphical user interface may be found in U.S. Patent App. No. 62/661,802, Ser. Nos. 15/949,708, and 15/272,752, the entirety of which are hereby incorporated by reference.

In some embodiments, the scheduling information may be a suggested work schedule based on previously received operational instructions and time of executing the instructions by the robotic device. An example of a method for generating a suggested work schedule of a robotic device may be found in U.S. patent application Ser. No. 15/449,660, the entirety of which is hereby incorporated by reference. For instance, some embodiments disclose a robotic floor-cleaning device, including: a shell; a chassis; a set of wheels; at least one motor to drive the wheels and move the robotic floor-cleaning device in a direction on a surface; a control device to activate and control the robotic floor-cleaning device's movement, a clock, a memory unit to store data, an input/output means connected to the control unit and a cleaning unit connected to the chassis. In some embodiments, the control unit is configured to save a date and time set by a user when the robotic floor-cleaning device should be turned on. In some embodiments, the control unit is further configured to suggest a work schedule based on the saved data to the user using the input/output means.

Some embodiments provide a schedule development method for a robotic floor-cleaning device that automatically devises a work schedule based on historical data. Some embodiments record user inputs indicating days and times to start work. Some embodiments develop a work schedule for future work based on the recorded inputs.

Some embodiments disclose a method for setting a work schedule for a robotic floor-cleaning device including: monitoring use times of a robotic floor-cleaning device over a preset period of time; storing the times and dates the robotic floor-cleaning device was turned on in a database; developing a suggested work schedule based on the stored data; and proposing the suggested work schedule to users through an input/output device.

Some embodiments provide a method including: monitoring use times of a robotic floor-cleaning device over a preset period of time; storing the times and dates the robotic floor-cleaning device was turned on in a database; devising a suggested work schedule from the stored data using a machine learning technique; proposing the suggested work schedule to users through an input/output device; accepting user adjustments to the suggested work schedule through the input/output device; and adding the user adjustment data to the database for use in devising future work schedules.

One skilled in the art will appreciate that different embodiments of the invention may use different machine learning techniques such as, but not limited to, supervised learning, unsupervised learning, reinforcement learning, semi-supervised learning, etc.

In some embodiments, the input/output device may be wireless and may send and receive signals to and from remote devices, such as, for example, remote controls and smartphones. In some embodiments, the floor-cleaning device may be scheduled directly via a user interface positioned thereon.

In some embodiments, inputs from a user and outputs from the robotic floor-cleaning device may be provided through a software application installed on an internet-connected device, such as a smartphone, a computer, or a tablet.

In an example of a process for devising a suggested work schedule, the process includes monitoring activation dates and times, storing the dates and times in a database, developing a suggested work schedule based on the stored data, and proposing the suggested work schedule.

In some embodiments, the suggested work schedule is developed based on times the robotic-floor cleaning device was turned on as per user-provided instruction. In some embodiments, the times the robotic-floor cleaning device was turned on is stored in a database. In some embodiments, the suggested work schedule is followed by the robotic floor-cleaning device after approval by the user of the suggested work schedule. In some embodiments, the suggested work schedule is developed based on data stored in the most recently updated database, wherein the database is continuously updated with new times the robotic-floor cleaning device was turned on.

In some embodiments, the suggested work schedule is developed based on the times the robotic-floor cleaning device was turned on that are stored in the database and using a start time that is the mean or median of the start times in the database, a start time that is the mean or median of a subset of the start times in the database, and/or using a machine learning algorithm to devise a work schedule based on the times in the database.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct.

Accordingly, the foregoing descriptions of embodiments and techniques have been presented for purposes of illustration and description. They are not intended to be exhaustive and/or to limit the invention to the precise forms disclosed. Obviously, many modifications and variations are possible in light of the above teaching.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

The invention claimed is:

1. A method of sending scheduling information to a robotic device comprising:
   generating, with an application of a communication device, at least one scheduling command, the application comprising a graphical user interface;
   transmitting, with the application, the at least one scheduling command to a router, wherein the router is configured to transmit the at least one scheduling command to a cloud service;
   receiving, with a processor of a robotic device, the at least one scheduling command from the cloud service;
   generating or modifying, with the processor of the robotic device, scheduling information of the robotic device based on the at least one scheduling command; and
   suggesting, with the application of the communication device, a schedule of the robotic device based on previously received operational instructions comprising at least a plurality of schedules previously executed by the robotic device at a particular past day and time specified in each of the plurality of schedules, wherein the robotic device cleans according to the suggested schedule only after approval of the suggested schedule by a user.

2. The method of claim 1, further comprising:
   transmitting, with the processor of the robotic device, robotic device status information to the cloud service; and
   receiving, with the application of the communication device, the robotic device status information from the cloud service.

3. The method of claim 1, wherein the application is configured to:
   display a map of an environment of the robotic device, a status of the robotic device, and a status of the environment;
   receive an input designating a rotation, elongation, trimming, deletion, addition, or modification of a boundary line of the map; a new position of a boundary line of the map;
   a deep cleaning setting or a regular cleaning setting; a speed setting; a movement pattern setting; a cleaning frequency setting; a service condition; a service type; a service frequency; a driving direction; a movement pattern; a cleaning intensity; a timer setting;
   and scheduling information, wherein the scheduling information comprises at least three of: a time of operation, at least one area of operation, an order in which areas are to be operated on, a frequency of operation, a type of operation corresponding to each area to be operated on, and a duration of operation; and
   transmit information received by the application to the robotic device.

4. The method of claim 1, wherein the application is configured to:
   transmit scheduling information, mapping information, navigation information, cleaning information, and operation information to the robotic device.

5. The method of claim 4, wherein the application is used to adjust the scheduling information, the mapping information, the navigation information, the cleaning information, and the operation information.

6. The method of claim 1, wherein the at least one scheduling command comprises at least a time of operation, at least one area of operation, an order in which areas are to be operated on, a frequency of operation, a type of operation corresponding to each area to be operated on, and a duration of operation.

7. The method of claim 1, wherein a stationary device having at least wireless connectivity capabilities transmits scheduling information to the cloud service.

8. The method of claim 1, wherein the application is configured to receive and transmit information independently of each of: a status of the robotic device, a location of the robotic device, a location of a charging station, and a location of the communication device.

9. The method of claim 1, wherein the robotic device is a robotic cleaning device comprising at least one of: a suction tool, a mopping tool, and a UV light.

10. A system for sending scheduling information to a robotic device comprising:
an application on a communication device comprising a graphical user interface, wherein the application is configured to:
generate at least one scheduling command;
transmit the at least one scheduling command to a router, wherein the router is configured to transmit the at least one scheduling command to a cloud service; and
suggest a schedule of the robotic device based on previously received operational instructions comprising at least a plurality of schedules previously executed by the robotic device at a particular past day and time specified in each of the plurality of schedules, wherein the robotic device cleans according to the suggested schedule only after approval of the suggested schedule by a user;
a robotic device configured to:
receive the at least one scheduling command from the cloud service; and
generate or modify scheduling information of the robotic device based on the at least one scheduling command.

11. The system of claim 10, wherein:
the robotic device is configured to transmit robotic device status information to the cloud service; and
the application is configured to receive the robotic device status information from the cloud service.

12. The system of claim 10, wherein the application is further configured to:
display a map of an environment of the robotic device, a status of the robotic device, and a status of the environment;
receive an input designating a rotation, elongation, trimming, deletion, addition, or modification of a boundary line of the map; a new position of a boundary line of the map;
a deep cleaning setting or a regular cleaning setting; a speed setting; a movement pattern setting; a cleaning frequency setting; a service condition; a service type; a service frequency; a driving direction; a movement pattern; a cleaning intensity; a timer setting;
and scheduling information; and
transmit information received by the application to the robotic device.

13. The system of claim 12, wherein the scheduling information comprises at least four of: a time of operation, at least one area of operation, an order in which areas are to be operated on, a frequency of operation, a type of operation corresponding to each area to be operated on, and a duration of operation.

14. The system of claim 10, wherein the application is further configured to:
transmit scheduling information, mapping information, navigation information, cleaning information, and operation information to the robotic device.

15. The system of claim 14, wherein the application is used to adjust the scheduling information, the mapping information, the navigation information, the cleaning information, and the operation information.

16. The system of claim 10, wherein the at least one scheduling command comprises at least a time of operation, at least one area of operation, an order in which areas are to be operated on, a frequency of operation, a type of operation corresponding to each area to be operated on, and a duration of operation.

17. The system of claim 10, wherein the system further comprises a stationary device having at least wireless connectivity capabilities, the stationary device configured to transmit scheduling information to the cloud service.

18. The system of claim 10, wherein the application is further configured to receive and transmit information independently of each of: a status of the robotic device, a location of the robotic device, a location of a charging station, and a location of the communication device.

19. The system of claim 1, wherein the robotic device is a robotic cleaning device comprising at least one of: a suction tool, a mopping tool, and a UV light.

20. The method of claim 1, wherein a machine learning algorithm uses the at least the plurality of schedules previously executed by the robotic device at a particular past day and time specified in each of the plurality of schedules to generate the suggested schedule.

* * * * *